Oct. 22, 1935.  S. EVANS  2,018,205
PLUNGER
Filed Sept. 29, 1934
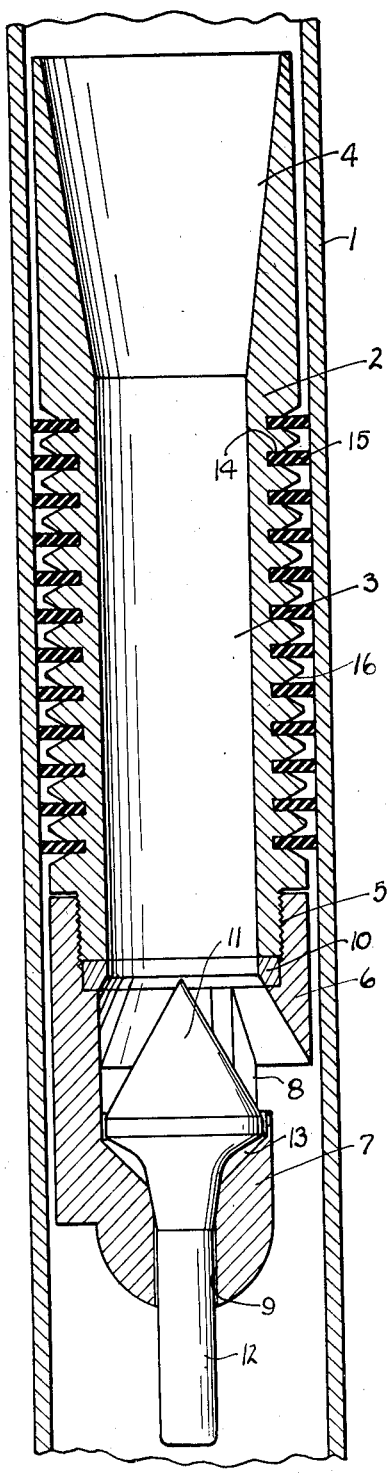
Seth Evans
INVENTOR.
BY Jesse R. Stone
ATTORNEYS.

Patented Oct. 22, 1935

2,018,205

UNITED STATES PATENT OFFICE 2,018,205

PLUNGER

Seth Evans, Houston, Tex., assignor to Hughes Tool Company, Houston, Tex., a corporation of Texas Application September 29, 1934, Serial No. 746,064

4 Claims. (Cl. 103—52)

My invention relates to the construction of a plunger to be employed in pneumatically operated plunger lift pumps.

In the usual plungers employed in pumps of this character the fit of the plunger must be fairly close within the eduction tube. This necessitates the provision of an eduction tube with comparatively smooth inner walls. Ordinary pipe must be reamed or smoothed off on its inner surface so that projections such as scale or corrosion will not interfere with the movement of the plunger in the tube.

I desire to provide a plunger of this character which will maintain sufficient sealing contact within the eduction tube where the tube has not been reamed or where irregularities on the inner surface of the tube have not been removed.

I contemplate making the plunger body of substantially smaller diameter than the inner diameter of the tube, and then employing flexible packing members to seal the space between the plunger body and the tube.

I wish to avoid the use of piston rings and the like which scrape the walls of the tube and provide instead a wiping contact between the plunger and the eduction tube.

In the drawing herewith is illustrated a central vertical section through my improved plunger shown positioned within an eduction tube.

In said drawing the pump barrel or eduction tube is shown at 1. It is to be understood that this tube may be ordinary unreamed tubing.

Within this tube the plunger body 2 fits loosely so as to provide free clearance as is clearly indicated. The body 2 has a passage 3 therethrough, the upper end of which flares outwardly at 4. The lower end of the body is reduced in outer diameter and threaded at 5 to connect with the upper threaded ring 6 on the support 7 for the valve 11.

The valve support 7 has an axial opening 9 therethrough to receive the valve stem 12 which projects below the support. A recess 13 in said support receives the valve head 11 which is tapered upwardly to fit the valve seat 10.

The valve seat is held removably at the lower end of the passage 3 in the body by an inner shoulder upon the ring 6 of the support. The support 7 is held in spaced relation below the ring 6 by legs 8.

The body 2 is provided on its outer periphery with a series of circumferential recesses 14 to receive packing rings or gaskets 15. Said recesses 14 are widened at their outer margins 16 so as to allow flexing of said rings.

The packing rings are of rubber or similar flexible construction and are of sufficient diameter to contact firmly with the inner wall of the tube. They fit closely within the recesses 14 and thus tend to seal about the plunger and within the tube.

It will be seen that the body of the plunger need not come into contact with the tube and will tend to be held spaced slightly therefrom by the sealing rings 15 which have a wiping contact with the inner surface of the tube.

In plungers of this character no close seal is necessary for the reason that fluid pressures at opposite ends of the plunger are not greatly different. The pressure of gas or air below the plunger is but slightly greater than the load of liquid above it. For this reason packing rings such as those shown will maintain sufficient seal even where there are irregularities on the inner wall of the tube. Unreamed pipe, having scale or other roughness thereon, can be used thus materially cheapening the cost of the installation.

What I claim as new is:

1. In a pneumatically operated pump, an eduction tube, a freely moving plunger body having an approximately cylindrical outer surface with circumferential outwardly flared grooves therein, said body being of smaller diameter than said tube, packing rings of flexible material and of uniform thickness fitting at their inner sides in said grooves and extending outwardly to contact with the inner walls of said tube, said plunger having a longitudinal passage and an upwardly closing valve at the lower end of said passage.

2. In a pneumatically operated pump, an eduction tube, a freely moving plunger body having an approximately cylindrical outer surface with circumferential grooves therein, said grooves being flared at their outer sides, said body being of smaller diameter than said tube, packing rings of flexible material in said grooves extending outwardly to contact with the inner walls of said tube, said plunger having a longitudinal passage and an upwardly closing valve at the lower end of said passage.

3. A pneumatically operated plunger adapted to be moved freely in an eduction tube, including a plunger body of smaller external diameter than the inner diameter of said tube, and a plurality of circumferential packing rings on said body extending outwardly into contact with said tube, the said rings being mounted to flex and make a wiping contact with said tube.

4. In a pneumatically operated pump, an eduction tube, a plunger movable freely therein from end to end of said tube and including a plunger body of smaller diameter than said tube, circumferential radial rings mounted in spaced relation along said body, said rings being of flexible material having a light wiping contact with the inner wall of said tube, and an upwardly closing valve on said plunger.

SETH EVANS.